US012779297B2

(12) United States Patent
Uenishi et al.

(10) Patent No.: US 12,779,297 B2

(45) Date of Patent: Nov. 3, 2026

(54) GOLF CLUB SHAFT

(71) Applicant: SUMITOMO RUBBER INDUSTRIES, LTD., Kobe (JP)

(72) Inventors: Yoshitomo Uenishi, Kobe (JP); Tatsuya Yashiki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 193 days.

(21) Appl. No.: 18/919,508

(22) Filed: Oct. 18, 2024

(65) Prior Publication Data

US 2025/0144485 A1 May 8, 2025

(30) Foreign Application Priority Data

Nov. 2, 2023 (JP) ................................ 2023-188771

(51) Int. Cl.

| | |
|---|---|
| ***A63B 53/10*** | (2015.01) |
| ***B32B 5/12*** | (2006.01) |
| ***B32B 5/14*** | (2006.01) |

(52) U.S. Cl.

CPC ................ *A63B 53/10* (2013.01); *B32B 5/12* (2013.01); *B32B 5/14* (2013.01)

(58) Field of Classification Search

CPC .. A63B 53/10; B32B 5/02; B32B 5/12; B32B 5/14

See application file for complete search history.

(56) References Cited

U.S. PATENT DOCUMENTS

| | | | | |
|---|---|---|---|---|
| 10,420,988 | B2 * | 9/2019 | Nakamura | A63B 53/14 |
| 10,420,995 | B2 * | 9/2019 | Takasu | A63B 60/42 |
| 2010/0260955 | A1 * | 10/2010 | Hasegawa | B32B 27/08 156/171 |
| 2015/0290900 | A1 * | 10/2015 | Tsunashima | C08J 5/243 428/36.1 |
| 2018/0221731 | A1 * | 8/2018 | Kaneko | B32B 27/08 |
| 2019/0076709 | A1 * | 3/2019 | Shimono | A63B 53/10 |
| 2019/0290978 | A1 * | 9/2019 | Mordasini | A63B 60/42 |
| 2020/0164254 | A1 * | 5/2020 | Nakamura | B29C 70/32 |
| 2020/0338409 | A1 * | 10/2020 | Takasu | A63B 53/10 |
| 2022/0126178 | A1 * | 4/2022 | Nakano | A63B 60/0081 |
| 2023/0079511 | A1 * | 3/2023 | Hasegawa | A63B 53/10 473/319 |

* cited by examiner

*Primary Examiner* — Justin M Krause

(74) *Attorney, Agent, or Firm* — Birch, Stewart, Kolasch & Birch, LLP

(57) ABSTRACT

A shaft having an entire length of L includes fiber reinforced resin layers including one or more straight layers, a bias layer, and hoop layers. The one or more straight layers include one or more full length straight layers each having a length of 0.7L or greater. The hoop layers include full length hoop layers each having a length of 0.7L or greater. The full length hoop layers consist only of one inner full length hoop layer and one outer full length hoop layer. At least one of the one or more full length straight layers is disposed inside the outer full length hoop layer. When thicknesses of the inner and outer full length hoop layers are denoted by T1 and T2, respectively, 1<T2/T1<2. The outer full length hoop layer has a resin content smaller than that of the inner full length hoop layer.

20 Claims, 6 Drawing Sheets

GOLF CLUB SHAFT

CROSS REFERENCE TO RELATED APPLICATION

The present application claims priority to Japanese Patent Application No. 2023-188771 filed on Nov. 2, 2023. The entire contents of this Japanese Patent Application are hereby incorporated by reference.

BACKGROUND

Technical Field

The present disclosure relates to golf club shafts.

Description of the Related Art

There have been known golf club shafts formed of a plurality of fiber reinforced resin layers. In such shafts, various shafts can be designed with laminated configurations of fiber reinforced resin layers. JP2023-36259A (US2023/0079511A1) discloses a shaft including a full length hoop layer and a partial hoop layer.

SUMMARY

A laminated configuration that can increase the strength of a shaft can contribute to weight reduction of the shaft. A laminated configuration that can increase the strength of a shaft can contribute to improvement in design flexibility of the shaft.

One example of the present disclosure provides a golf club shaft including a new laminated configuration that can increase the strength of the shaft.

In one aspect, a golf club shaft includes a plurality of fiber reinforced resin layers, a tip end, and a butt end. The fiber reinforced resin layers include one or more straight layers, one or more bias layers, and hoop layers. An entire length of the golf club shaft is denoted by L. The one or more straight layers include one or more full length straight layers each having a length of greater than or equal to 0.7L relative to the entire length L of the golf club shaft. The hoop layers include full length hoop layers each having a length of greater than or equal to 0.7L relative to the entire length L of the golf club shaft. The full length hoop layers consist only of one inner full length hoop layer, and one outer full length hoop layer located outside the inner full length hoop layer. At least one of the one or more full length straight layers is disposed inside the outer full length hoop layer. When the inner full length hoop layer has a thickness denoted by T1 (mm), and the outer full length hoop layer has a thickness denoted by T2 (mm), T2/T1 is greater than 1 and less than 2. The outer full length hoop layer has a resin content smaller than a resin content of the inner full length hoop layer.

DESCRIPTION OF THE PREFERRED EMBODIMENTS

Hereinafter, embodiments will be described in detail with appropriate references to the accompanying drawings.

The term "layer" and the term "sheet" are used in the present disclosure. The "layer" is a term used for after being wound. In contrast, the "sheet" is a term used for before being wound. The "layer" is formed by winding the "sheet". That is, the wound "sheet" forms the "layer".

In the present disclosure, the same symbol is used in the layer and the sheet. For example, a layer formed by a sheet s1 is referred to as a layer s1.

In the present disclosure, the term "axial direction" means the axial direction of a shaft. In the present disclosure, the term "circumferential direction" means the circumferential direction of a shaft. Unless otherwise described, the term "length" in the present disclosure means a length in the axial direction. Unless otherwise described, the term "position" in the present disclosure means a position in the axial direction. Unless otherwise described, the terms "inside" and "inner side" in the present disclosure mean inside in the radial direction (radial inside) of the shaft, and also referred to as "inner layer side". Unless otherwise described, the terms "outside" and "outer side" in the present disclosure mean the outside in the radial direction (radial outside) of the shaft, and also referred to as "outer layer side".

Figure 1:
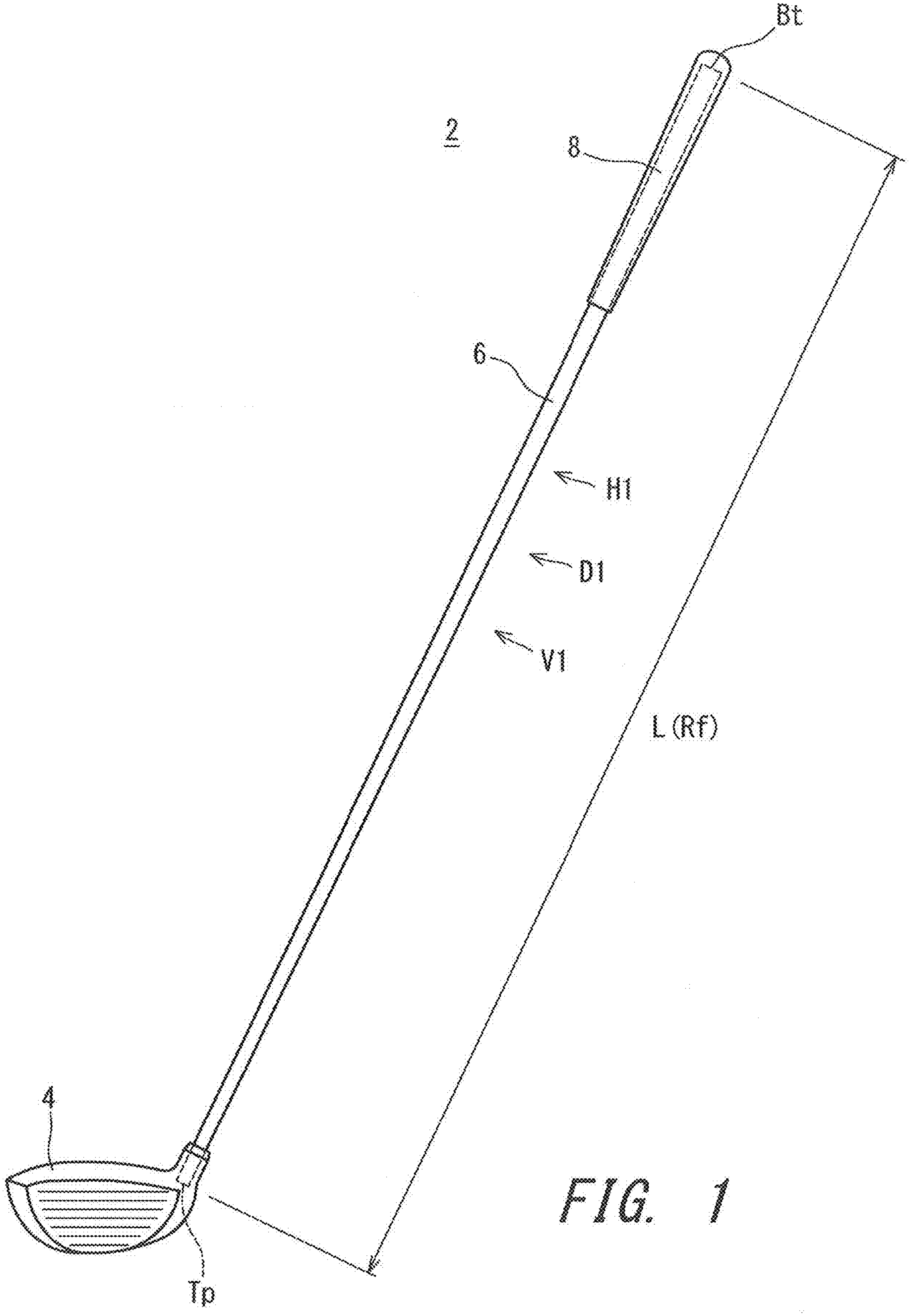
FIG. 1 is an overall view of a golf club that includes a golf club shaft according to an embodiment.

FIG. 1 shows a golf club 2 in which a golf club shaft 6 according to the present disclosure is attached. The golf club 2 includes a head 4, the shaft 6, and a grip 8. The head 4 is disposed at a tip portion of the shaft 6. The grip 8 is disposed at a butt portion of the shaft 6. The shaft 6 is a shaft for a wood type club. The golf club 2 is a driver (number 1 wood). The head 4 is a driver head. The shaft 6 is a shaft used for drivers.

There is no limitation on the head 4 and the grip 8. Examples of the head 4 include a wood type head, a utility type head, an iron type head, and a putter head. In the present embodiment, the head 4 is a wood type head.

The shaft 6 includes a plurality of fiber reinforced resin layers. The kind of fibers is not limited. Examples of a fiber reinforced resin layer include a carbon fiber reinforced resin layer and a glass fiber reinforced resin layer. The shaft 6 is in a tubular form. Although not shown in FIG. 1, the shaft 6 has a hollow structure. The shaft 6 includes a tip end Tp and a butt end Bt. The head 4 is attached to the tip portion which includes the tip end Tp. The grip 8 is attached to the butt portion which includes the butt end Bt. In the golf club 2, the tip end Tp is located inside the head 4. In the golf club 2, the butt end Bt is located inside the grip 8.

The shaft 6 includes a tapered portion in which the outer diameter of the shaft 6 continuously increases toward the butt end Bt. In the shaft 6, at least a region that extends from a position located 200 mm apart from the tip end Tp to a position located 900 mm apart from the tip end Tp is 15 the tapered portion.

A double-ended arrow L in FIG. 1 shows the entire length of the shaft 6. This shaft entire length L is measured in the axial direction. The shaft entire length L is a distance between the tip end Tp and the butt end Bt. In the present disclosure, the letter L is used not only as a reference symbol in drawings but also as a symbol that represents the shaft entire length.

The shaft 6 is formed by winding a plurality of prepreg sheets. In the prepreg sheets, fibers are oriented substantially in one direction. Such a prepreg in which fibers are oriented substantially in one direction is also referred to as a UD prepreg. The term "UD" stands for unidirectional. Note that a prepreg other than UD prepreg may be used in the prepreg sheets. For example, fibers contained in the prepreg sheets may be woven. In the present disclosure, the prepreg sheet(s) is/are also simply referred to as a sheet(s).

Each prepreg sheet contains fibers and a resin. The resin is also referred to as a matrix resin. Carbon fibers and glass fibers are exemplified as the fibers. The matrix resin is typically a thermosetting resin.

Examples of the matrix resin in the prepreg sheet include a thermosetting resin and a thermoplastic resin. From the viewpoint of shaft strength, the matrix resin is preferably a thermosetting resin, and more preferably an epoxy resin.

The shaft 6 is manufactured by a sheet-winding method. In the prepreg, the matrix resin is in a semi-cured state. In the shaft 6, the prepreg sheets are wound and cured. This "cured" means that the semi-cured matrix resin is cured. The curing process is achieved by heating. The manufacturing processes of the shaft 6 include a heating process. The heating process cures the matrix resin in the prepreg sheets.

Figure 2:
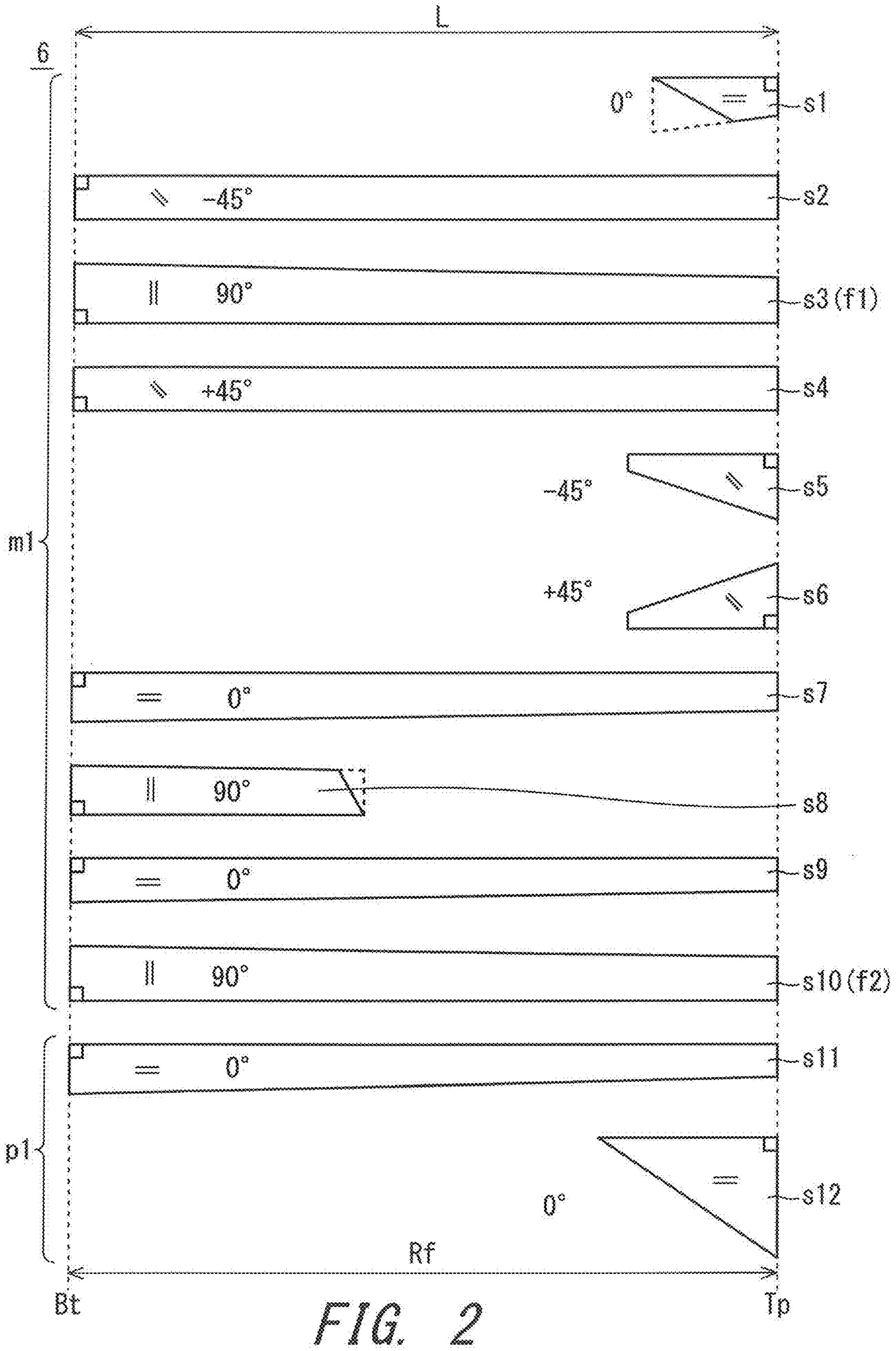
FIG. 2 is a developed view of the golf club shaft in FIG. 1.

FIG. 2 is a developed view of prepreg sheets constituting the shaft 6. FIG. 2 shows the sheets constituting the shaft 6. The shaft 6 is constituted by the plurality of sheets. As shown in FIG. 2, the shaft 6 is constituted by 12 sheets. The shaft 6 includes a first sheet s1 to a twelfth sheet s12. The developed view shows the sheets constituting the shaft 6 in order from the radial inside of the shaft 6. The sheets are wound in order from the sheet located on the uppermost side in FIG. 2. In FIG. 2, the horizontal direction of the figure coincides with the axial direction of the shaft. In FIG. 2, the right side of the figure is the tip side of the shaft. In FIG. 2, the left side of the figure is the butt side of the shaft.

FIG. 2 shows not only the winding order of the sheets but also the position of each of the sheets in the axial direction. For example, in FIG. 2, an end of the sheet s1 is located at the tip end Tp.

The shaft 6 includes a straight layer, a bias layer, and a hoop layer. The shaft 6 does not include a resin layer that does not contain fibers. Alternatively, the shaft 6 may include a resin layer that does not contain fibers. Each layer of the shaft 6 is a carbon fiber reinforced layer or a glass fiber reinforced layer. All of the layers constituting the shaft 6 may be carbon fiber reinforced layers.

An orientation angle of the fibers (hereinafter referred to as fiber orientation angle) is described for each of the sheets in FIG. 2. A sheet described as "0°" is a straight sheet. The straight sheet forms the straight layer.

The straight layer is a layer in which the fiber orientation angle is substantially set to 0° with respect to the axial direction. Usually, the fiber orientation may not completely be parallel to the shaft axial direction due to an error in winding, for example. In the straight layer, an absolute angle of the fiber orientation angle with respect to the shaft axis line is less than or equal to 10°. The absolute angle means an absolute value of an angle (fiber orientation angle) formed between the shaft axis line and the orientation of fibers. That is, "the absolute angle is less than or equal to 10°" means that "the fiber orientation angle is greater than or equal to −10 degrees and less than or equal to +10 degrees".

In the embodiment of FIG. 2, straight layers are the layer s1, the layer s7, the layer s9, the layer s11, and the layer s12.

The bias layer is a layer in which the fiber orientation is substantially inclined with respect to the axial direction. Layers described as "−45°" or "+45°" in FIG. 2 are the bias layers. Preferably, bias layers are constituted by a combination of two sheets in which fiber orientation angles of the respective sheets are inclined inversely to each other. The combination of two sheets is also referred to as a sheet pair. Preferably, the sheet pair includes: a sheet having a fiber orientation angle of greater than or equal to −60° and less than or equal to −30°; and a sheet having a fiber orientation angle of greater than or equal to 30° and less than or equal to 60°. That is, the bias layers include: a layer having a fiber orientation angle of greater than or equal to −60° and less than or equal to −30°; and a layer having a fiber orientation angle of greater than or equal to 30° and less than or equal to 60°. Thus, the absolute angle in the bias layers is preferably greater than or equal to 30° and less than or equal to 60°. The absolute angle in the bias layers is more preferably 45°±5°, that is, more preferably greater than or equal to 40° and less than or equal to 50°.

In the shaft 6, the bias layers are the layer s2, the layer s4, the layer s5, and the sheet s6. The layer s2 and the layer s4 are formed by a first sheet pair. The layer s5 and the layer s6 are formed by a second sheet pair.

In the bias layers, the plus sign (+) and minus sign (−) used with the fiber orientation angle indicate inclined direction of the fibers. A sheet having a plus fiber orientation angle and a sheet having a minus fiber orientation angle are combined in each sheet pair. In each sheet pair, fibers in respective sheets are inclined inversely to each other. In FIG. 2, the direction of lines showing the direction of the fibers of the sheet s2 is the same as the direction of lines showing the direction of the fibers of the sheet s4. However, the sheet s4 is reversed and then the sheet s2 and the sheet s4 are stuck together. Accordingly, fiber orientation angles of the respective sheets are inclined inversely to each other. This relationship holds true for the layer s5 and the layer 6.

The hoop layer is a layer that is disposed so that the fiber orientation substantially coincides with the circumferential direction of the shaft. A layer described as "90°" in FIG. 2 is the hoop layer. Preferably, in the hoop layer, the absolute angle of the fiber orientation angle is substantially set at 90° with respect to the shaft axial direction. However, the fiber orientation angle with respect to the shaft axial direction may not be completely set at 90° due to an error in winding, for example. In the hoop layer, the absolute angle of the fiber orientation angle is usually greater than or equal to 80° and less than or equal to 90°.

In the embodiment of FIG. 2, the hoop layers are the layer s3, the layer s8, and the layer s10.

As described above, in the present disclosure, the sheets and the layers are classified by their fiber orientation angles. Furthermore, in the present disclosure, the sheets and the layers are classified by their lengths in the axial direction.

A layer that has a length in the axial direction of greater than or equal to 70% (0.7L) of the shaft entire length L is referred to as a full length layer. Hereinafter, a length in the axial direction is also referred to as an axial directional length. The axial directional length of the full length layer can be greater than or equal to 0.7L, further can be greater than or equal to 0.8L, and still further can be greater than or equal to 0.9L. The axial directional length of the full length layer may be equal to the shaft entire length L. In the embodiment of FIG. 2, the axial directional lengths of all of the full length layers are equal to the shaft entire length L.

In the embodiment of FIG. 2, the full length layers are the layer s2, the layer s3, the layer s4, the layer s7, the layer s9, the layer s10, and the layer s11.

A layer having an axial directional length of less than 70% (0.7L) of the shaft entire length L is also referred to as a partial layer. In the embodiment of the FIG. 2, the partial layers are the layer s1, the layer s5, the layer s6, the layer s8, and the layer s12.

A layer that is the bias layer and the full length layer is referred to as a full length bias layer. A layer that is the straight layer and the full length layer is referred to as a full length straight layer. A layer that is the hoop layer and the full length layer is referred to as a full length hoop layer.

The shaft 6 includes a plurality of full length straight layers. In the embodiment of FIG. 2, the full length straight layers are the layer s7, the layer s9 and the layer s11. The shaft 6 includes a plurality of full length bias layers. The full length bias layers are the layer s2 and the layer s4. The shaft 6 includes a plurality of (two) full length hoop layers. The full length hoop layers are the layer s3 and the layer s10. The full length hoop layers included in the shaft 6 are only the layer s3 and the layer s10. The layer s3 is located inside the layer s10. For this reason, the layer s3 is referred to as an inner full length hoop layer f1. The number of plies of the inner full length hoop layer f1 is 1. The layer s10 is located outside the layer s3. For this reason, the layer s10 is referred to as an outer full length hoop layer f2. The number of plies of the outer full length hoop layer f2 is 1. The layer s3 (the inner full length hoop layer f1) is located between the full length bias layer s2 and the full length bias layer s4. The layer s10 (the outer full length hoop layer f2) is a layer contiguous to the inner side of the full length straight layer s11 that is the outermost layer among the full length layers.

The number of layers interposed between the inner full length hoop layer f1 and the outer full length hoop layer f2 is not limited. Preferably, at least one full length layer is interposed between the inner full length hoop layer f1 and the outer full length hoop layer f2. In the embodiment of FIG. 2, a plurality of full length layers are interposed between the inner full length hoop layer f1 and the outer full length hoop layer f2. A plurality of (two) full length straight layers are interposed between the inner full length hoop layer f1 and the outer full length hoop layer f2.

The layer s7 that is the innermost layer among the full length straight layers is located between the inner full length hoop layer f1 and the outer full length hoop layer f2. Among the full length straight layers, the layer s9 that is the second layer counted from the inner layer side is located between the inner full length hoop layer f1 and the outer full length hoop layer f2. The layer s11 that is the outermost layer among the full length straight layers is located outside the outer full length hoop layer f2.

A layer that is the bias layer and the partial layer is referred to as a partial bias layer. A layer that is the straight layer and the partial layer is referred to as a partial straight layer. A layer that is the hoop layer and the partial layer is referred to as a partial hoop layer.

The shaft 6 includes a partial bias layer. In the embodiment of FIG. 2, the layer s5 and the layer s6 are partial bias layers. The partial bias layers s5 and s6 are located between the inner full length hoop layer f1 and the outer full length hoop layer f2.

The shaft 6 includes a partial straight layer. In the embodiment of FIG. 2, the layer s1 and the layer s12 are the partial straight layers. The layer s1 that is the innermost layer between the partial straight layers is located inside the inner full length hoop layer f1. The layer s12 that is the outermost layer between the partial straight layers is located outside the outer full length hoop layer f2.

The shaft 6 includes a partial hoop layer. In the embodiment of FIG. 2, the layer s8 is the partial hoop layer. The partial hoop layer s8 is located between the inner full length hoop layer f1 and the outer full length hoop layer f2. When one or two or more partial hoop layers are included in the shaft 6, all of the partial hoop layers may be located between the inner full length hoop layer f1 and the outer full length hoop layer f2.

The shaft 6 includes a tip partial straight layer. The layer s1 and the layer s12 are the tip partial straight layers. Each tip partial straight layer is a partial straight layer disposed on the tip portion of the shaft 6. One end of each tip partial straight layer is located at the tip end Tp.

The shaft 6 does not include a butt partial straight layer. The butt partial straight layer is a partial straight layer disposed on the butt portion of the shaft 6. One end of the butt partial straight layer is located at the butt end Bt. The shaft 6 may include the butt partial straight layer.

The shaft 6 includes a butt partial hoop layer. The layer s8 is the butt partial hoop layer. The butt partial hoop layer s8 is disposed on the butt portion of the shaft 6. One end of the butt partial hoop layer s8 is located at the butt end Bt. The butt partial hoop layer s8 is located between the inner full length hoop layer f1 and the outer full length hoop layer f2. When the shaft 6 includes one or two or more butt partial hoop layers, all of the butt partial hoop layers may be located between the inner full length hoop layer f1 and the outer full length hoop layer f2.

The shaft 6 includes a region Rf in which both of the inner full length hoop layer f1 and the outer full length hoop layer f2 are disposed. The region Rf is a region in the axial direction. In the shaft 6, since both of the inner full length hoop layer f1 and the outer full length hoop layer f2 are disposed in a region that extends from the tip end Tp to the butt end Bt, the region Rf is the region extending from the tip end Tp to the butt end Bt. Alternatively, the region Rf may be a part of the shaft 6.

The shaft 6 includes a full length layer other than the full length hoop layers f1 and f2. In the embodiment of FIG. 2, the full length bias layers s2 and s4, and full length straight layers s7, s9 and s11 are the full length layers other than the full length hoop layers f1 and f2. Except for the outermost full length straight layer s11, the full length layers other than the full length hoop layers f1 and f2 are disposed inside the outer full length hoop layer f2.

As described later, the surface of the shaft 6 is polished in the finishing process. Of the fiber reinforced resin layers constituting the shaft 6, the outermost layer is polished. In the present disclosure, the polished layer is referred to as a protective layer p1. In the embodiment of FIG. 2, the layer s11 and the layer s12 are the protective layers p1. The protective layers p1 include the full length straight layer s11. The protective layers p1 include the partial straight layer s12. In the finished shaft 6, the protective layers p1 are polished. That is, in the finished shaft 6, at least a part of the thickness of each protective layer p1 is removed by polishing.

In the present disclosure, layers located inside the protective layers s11 and s12 are referred to as body layers m1. In the embodiment of FIG. 2, the layers s1 to s10 are the body layers m1. The body layers m1 include the inner full length hoop layer f1 and the outer full length hoop layer f2. The body layers m1 also include two full length straight layers s7 and s9. The body layers m1 also include two full length bias layers s2 and s4. The body layers m1 include the full length layers s2, s3, s4, s7, s9, and s10.

Thus, the fiber reinforced resin layers constituting the shaft 6 are constituted by the protective layers p1 which are polished and the body layers m1 located inside the protective layers p1. In the embodiment of FIG. 2, the protective layers p1 are the straight layers s11 and s12. The protective layers p1 include the full length straight layer s11. The protective layers p1 may include a resin layer that does not contain fibers. Examples of the resin layer include an epoxy resin layer.

The body layers m1 include the full length layers s2, s3, s4, s7, s9 and s10, each having a length of greater than or equal to 0.7L relative to the shaft entire length L. Among the full length layers of the body layers m1, the outermost layer is the layer s10 (outer full length hoop layer f2). Among the full length layers of the body layers m1, the innermost layer is the layer s2. The layer s2 is the full length bias layer. The inner full length hoop layer f1 (layer s3) is in contact with the layer s2. Alternatively, among the full length layers of the body layers m1, the innermost layer may be the inner full length hoop layer f1.

The outline of manufacturing processes of the shaft 6 is as follows.

[Outline of Manufacturing Processes of Shaft]

(1) Cutting Process

Prepreg sheets are cut into respective desired shapes in the cutting process. Each of the sheets shown in FIG. 2 is cut out in this process.

The cutting may be performed by a cutting machine or may be manually performed. In the manual case, a cutter knife is used, for example.

(2) Sticking Process

In the sticking process, a plurality of sheets are stuck together to produce a united sheet. Each of the above-described sheet pairs for the bias layers is preferably prepared as the united sheet. In addition, since it is difficult to wind a hoop sheet solely, the hoop sheet is preferably stuck on another sheet to produce the united sheet. In the sticking process, heating and/or pressing may be carried out.

(3) Winding Process

A mandrel is prepared in the winding process. A typical mandrel is made of a metal. A mold release agent is applied to the mandrel. Furthermore, a resin having tackiness is applied to the mandrel. This resin is also referred to as a tacking resin. The cut sheets are wound around the mandrel. Each united sheet is wound in the state of the united sheet. The tacking resin facilitates the application of the end part of a sheet to the mandrel.

A wound object is obtained in the winding process. The wound object is made by winding the prepreg sheets around the outside of the mandrel. For example, the winding is achieved by rolling an object to be wound on a plane. The winding may be manually performed or may be performed by a machine. The machine is referred to as a rolling machine.

(4) Tape Wrapping Process

A tape is wrapped around the outer circumferential surface of the wound object in the tape wrapping process. The tape is also referred to as a wrapping tape. The wrapping tape is helically wrapped while tension is applied to the tape so that there is no gap between adjacent windings. The wrapping tape applies pressure to the wound object. The pressure contributes to reduction of voids.

(5) Curing Process

In the curing process, the wound object after being subjected to the tape wrapping is heated. The heating cures the matrix resin. In the curing process, the matrix resin fluidizes temporarily. The fluidization of the matrix resin can discharge air from between the sheets or in each sheet. The fastening force of the wrapping tape accelerates the discharge of the air. The curing provides a cured laminate.

(6) Process of Extracting Mandrel and Process of Removing Wrapping Tape

The process of extracting the mandrel and the process of removing the wrapping tape are performed after the curing process. The process of removing the wrapping tape is preferably performed after the process of extracting the mandrel.

(7) Process of Cutting Off Both Ends

Both end portions of the cured laminate are cut off in the process. The cutting off flattens the end face of the tip end Tp and the end face of the butt end Bt.

(8) Polishing Process

The surface of the cured laminate is polished in the process. Spiral unevenness is present on the surface of the cured laminate as the trace of the wrapping tape. The polishing can remove the unevenness to smooth the surface of the cured laminate.

(9) Coating Process

The cured laminate after the polishing process is subjected to coating.

The strength of the shaft 6 is evaluated by measuring three-point flexural strength and crushing strength.

The three-point flexural strength can be measured by a three-point flexural strength test in accordance with SG standards. This test is a test (CPSA0098) for golf club shafts stipulated by Consumer Product Safety Association in JAPAN. In this test, strength is usually measured at points T, A, B, and C. The point T is a position located 90 mm apart from the tip end Tp. The point A is a position located 175 mm apart from the tip end Tp. The point B is a position located 525 mm apart from the tip end Tp. The point C is a position located 175 mm apart from the butt end Bt. Strength at a point AB can also be measured in this test. The point AB is the middle position between the point A and the point B, that is, a position located 350 mm apart from the tip end Tp.

Figure 3:
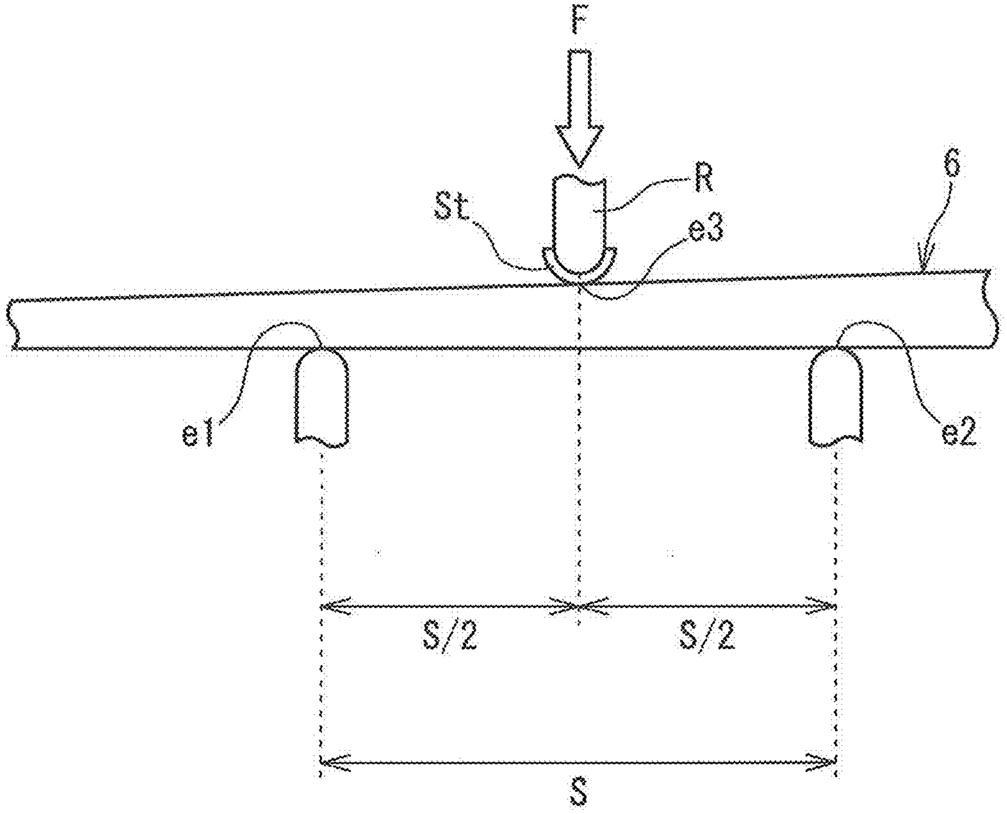
FIG. 3 is a schematic diagram illustrating a method for measuring a three-point flexural strength.

FIG. 3 illustrates the method for measuring the three-point flexural strength. An indenter R is moved downward from above the shaft 6 to apply a load F to the shaft 6 at a load point e3 while the shaft 6 is supported at two support points e1 and e2 from below the shaft 6. The indenter R is moved downward at a speed of 20 mm/min. A silicone rubber St is attached to a tip end of the indenter R. The load point e3 is at a position that divides the distance between the support point e1 and the support point e2 into two equal parts. The load point e3 is the point at which the strength is measured. The distance between the two support points e1 and e2 is referred to as span S. When the strength is measured at the point A, the point B, and the point C, the span S is 300 mm. When the strength is measured at the point T, the span S is 150 mm. The value (peak value) of the load F when the shaft 6 is fractured is the measured value.

Figure 4:
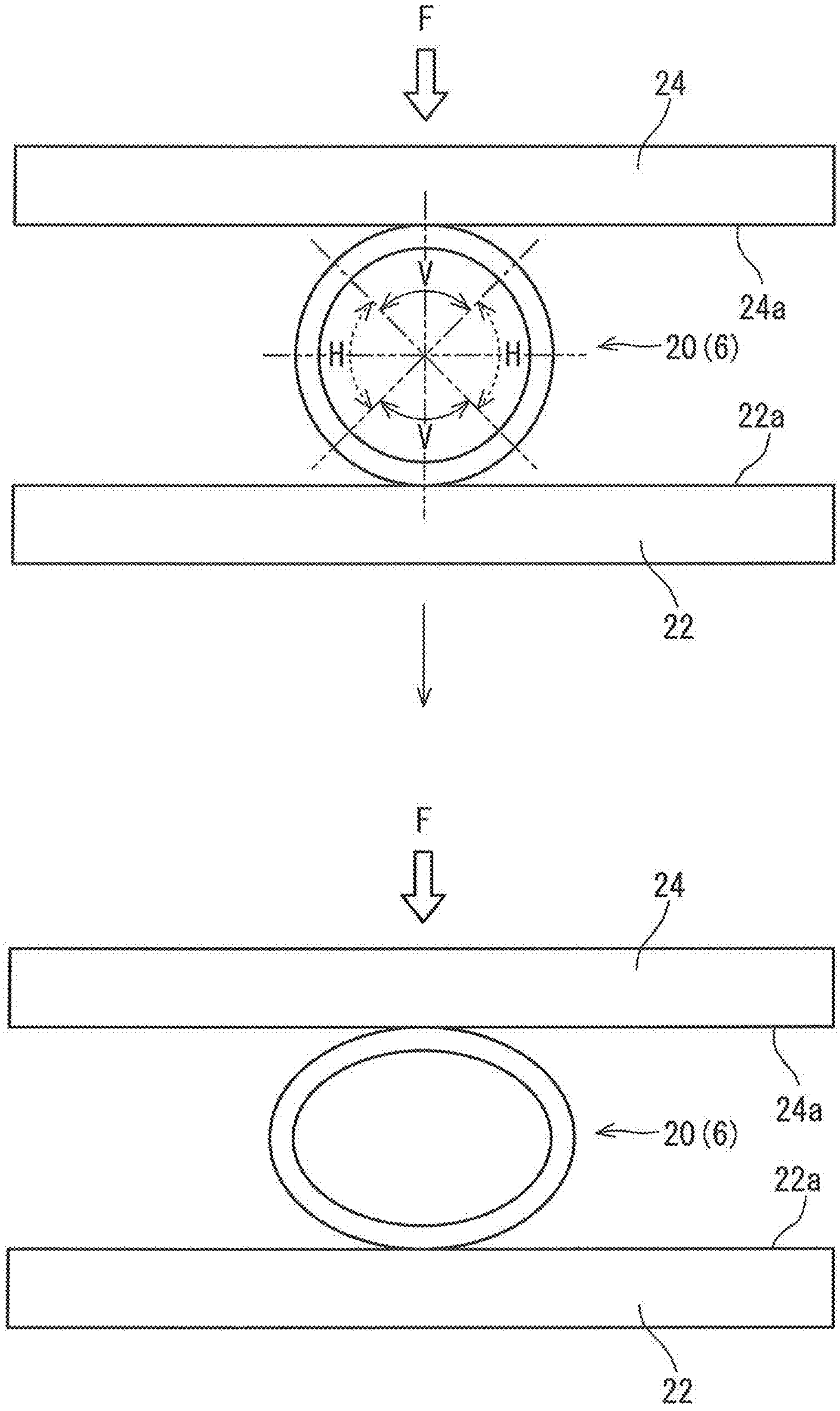
FIG. 4 is a schematic diagram illustrating a method for measuring a crushing strength.

The crushing strength is measured by a test in which the shaft 6 is compressed in the vertical direction (up-down direction) of the cross section of the shaft 6 (hereinafter this direction is also referred to as cross-sectional vertical direction). FIG. 4 illustrates the method for measuring the crushing strength. For this measurement, a universal testing machine (model 220X) produced by Intesco Co., Ltd. is used. A sample 20 that has a ring shape, has a point to be measured at its center in the axial direction, and has a width in the axial direction of 10 mm is cut out from the shaft 6. The sample 20 is placed on a horizontal plane that is an upper surface 22*a* of a receiving jig 22, and compressed by a compressing jig 24. A lower surface 24*a* of the compressing jig 24, which is a surface pressing the sample 20, is a flat surface parallel to the upper surface 22*a* of the receiving jig 22. The compressing jig 24 is moved vertically downward to compress the sample 20. The compressing jig 24 is moved downward at a speed of 5 mm/min. As the compressing jig 24 moves downward, the lower surface 24*a* approaches the upper surface 22*a*. As the lower surface 24*a* approaches the upper surface 22*a*, the sample 20 is deformed such that the cross section of the shaft is compressed (see lower part of FIG. 4). When the compressing jig 24 is moved further downward, the shaft 6 is fractured. The value (peak value) of the load applied to the shaft 6 when the shaft 6 is fractured is the measured value.

Figure 5:
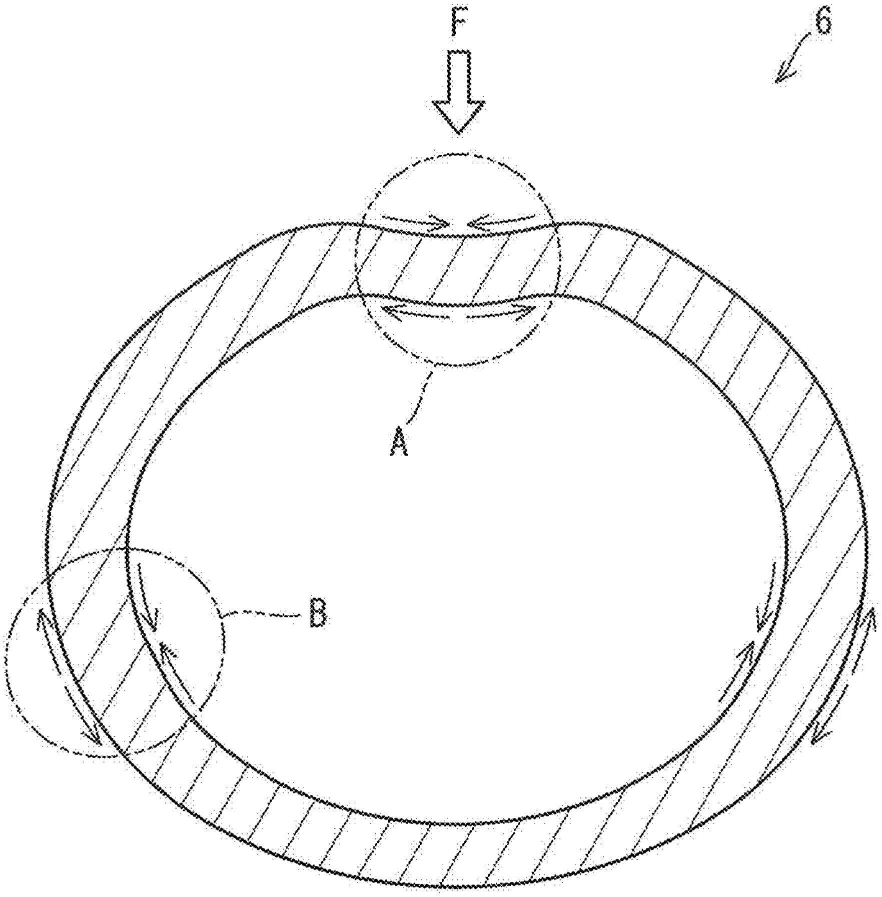
FIG. 5 illustrates a horizontal cross section of the shaft when the shaft is pressed toward inside in the radial direction of the shaft from above.

FIG. 5 shows a cross section of the shaft 6 when the shaft 6 is deformed by applying an external force toward radial inside of the shaft 6. The deformation in FIG. 5 is exaggerated for the sake of easy understanding. The deformation shown in FIG. 5 occurs when the shaft 6 is compressed from above, which corresponds to the deformation caused when the three-point flexural strength is measured.

The inventors of the present disclosure have found that the strength of a shaft can be increased by suppressing the reduction of flexural rigidity caused with compressive deformation of the cross section of the shaft. When the shaft 6 is deformed as shown in FIG. 5, the following two regions A and B can be generated in the shaft 6: region A in which tensile stress is applied to the inner layer side of the shaft 6 and compressive stress is applied to the outer layer side of the shaft 6, and region B in which compressive stress is applied to the inner layer side of the shaft 6 and tensile stress is applied to the outer layer side of the shaft 6. When tensile stress is applied on the inner layer side of the shaft 6, compressive deformation of the shaft 6 can be suppressed by disposing a hoop layer on the inner layer side. When tensile stress is applied on the outer layer side of the shaft 6, compressive deformation of the shaft 6 can be suppressed by disposing a hoop layer on the outer layer side. By providing the inner full length hoop layer f1 and the outer full length hoop layer f2, compressive deformation is suppressed in both the region A where tensile stress is applied on the inner layer side and the region B where tensile stress is applied on the outer layer side. This suppresses the reduction of flexural rigidity caused by compressive deformation of the shaft, thereby improving the strength of the shaft 6.

As shown in the upper part of FIG. 4, in the measurement of the crushing strength, the shaft 6 before being subjected to compressive deformation has a vertical position V and a horizontal position H. The vertical position V and the horizontal position H are positions in the circumferential direction of the shaft 6. The vertical position V is a position having a width in the circumferential direction from −45° to +45° relative to a direction (cross-sectional vertical direction) in which the receiving jig 22 and the compressing jig 24 are brought into contact with the shaft 6. The vertical position V is indicated by solid double-ended arrows (the sections indicated by two solid double-ended arrows are collectively referred to as the vertical position V). The horizontal position H is a position having a width in the circumferential direction from −45° to +45° relative to a direction (cross-sectional horizontal direction) perpendicular to the cross-sectional vertical direction. The horizontal position H is indicated by dashed double-ended arrows (the sections indicated by two dashed double-ended arrows are collectively referred to as the horizontal position H). All positions other than the vertical position V are the horizontal position H.

Since the shaft 6 is pressed toward radial inside in the measurement of the crushing strength, the region A and the region B can be generated also in this test. The external force is applied only from above the shaft 6 in FIG. 5. However, in the test of the crushing strength shown in FIG. 4, an external force is applied from above and below the shaft 6. Accordingly, in the test of the crushing strength in FIG. 4, the area A can be generated not only on the upper-side part but also on the lower-side part of the shaft 6.

In the crushing strength test, a starting point of fracture is located in either the vertical position V or the horizontal position H. In the vertical position V, compressive stress can act on the outer layer side of the shaft 6, and tensile stress can act on the inner layer side of the shaft 6. In the horizontal position H, tensile stress can act on the outer layer side of the shaft 6, and compressive stress can act on the inner layer side of the shaft 6. When the starting point of fracture is located in the vertical position V, it is considered that the fracture starts in the region A where tensile stress acts on the inner layer side of the shaft 6. In this case, the inner full length hoop layer f1 can effectively increase the fracture strength of the shaft 6. When the starting point of fracture is located in the horizontal position H, it is considered that the fracture starts in the region B where tensile stress acts on the outer layer side of the shaft 6. In this case, the outer full length hoop layer f2 can effectively increase the fracture strength of the shaft 6.

The shaft 6 may include a vertical fracture portion V1 in which the starting point of fracture is located in the vertical position V in the crushing strength test, and a horizontal fracture portion H1 in which the starting point of fracture is located in the horizontal position H in the crushing strength test (see FIG. 1). In this case, the inner full length hoop layer f1 can effectively exhibit its advantageous effect in either one of the vertical position V and the horizontal position H, and the outer full length hoop layer f2 can effectively exhibit its advantageous effect in the other one of the vertical position V and the horizontal position H. Accordingly, the inner full length hoop layer f1 and the outer full length hoop layer f2 can effectively increase the strength of the shaft 6. From this viewpoint, it is preferable that the vertical fracture portion V1 and the horizontal fracture portion H1 are present in the region Rf in which both the inner full length hoop layer f1 and the outer full length hoop layer f2 are disposed.

The radii of the layers on the outer layer side of the shaft 6 are large. The radii of the layers on the inner layer side of the shaft 6 are small. A cylinder having a larger diameter is easier to be crushed. Similarly, a layer having a large radius tends to reduce its effect of suppressing compressive deformation of the shaft 6. In comparison between hoop layers having a same thickness, a hoop layer having a larger radius has a smaller effect of suppressing the compressive deformation as compared with that of a hoop layer having a smaller radius. By making the thickness T2 of the outer full length hoop layer f2 greater than the thickness T1 of the inner full length hoop layer f1, compressive deformation is suppressed on both the outer layer side and the inner layer side of the shaft 6. In addition, the shaft 6 can be lightened by not increasing the thickness of the inner full length hoop layer f1 more than necessary. The thickness T1 is obtained by multiplying the thickness of the prepreg sheet constituting the inner full length hoop layer f1 by the number of plies (the number of windings). When the number of plies is 1, the thickness of the prepreg sheet of the inner full length hoop layer f1 is the thickness T1. Similarly, the thickness T2 is obtained by multiplying the thickness of the prepreg sheet constituting the outer full length hoop layer f2 by the number of plies. When the number of plies is 1, the thickness of the prepreg sheet of the outer full length hoop layer f2 is the thickness T2.

As described above, compressive deformation can be suppressed by increasing the thickness of the outer full length hoop layer f2. However, as the thickness of the outer full length hoop layer f2 increases, the full length straight layers disposed inside the outer full length hoop layer f2 are located relatively on the further inner layer side. When the full length straight layers are disposed on the inner layer side, the flexural rigidity of the shaft 6 decreases, and more straight layers are required to increase the flexural rigidity. By making the resin content of the outer full length hoop layer f2 smaller than the resin content of the inner full length hoop layer f1, the amount of fibers of the outer full length hoop layer f2 can be maintained while suppressing the thickness of the outer full length hoop layer f2. Accordingly, the strength of the shaft 6 can be increased while maintaining its flexural rigidity.

Figure 6:
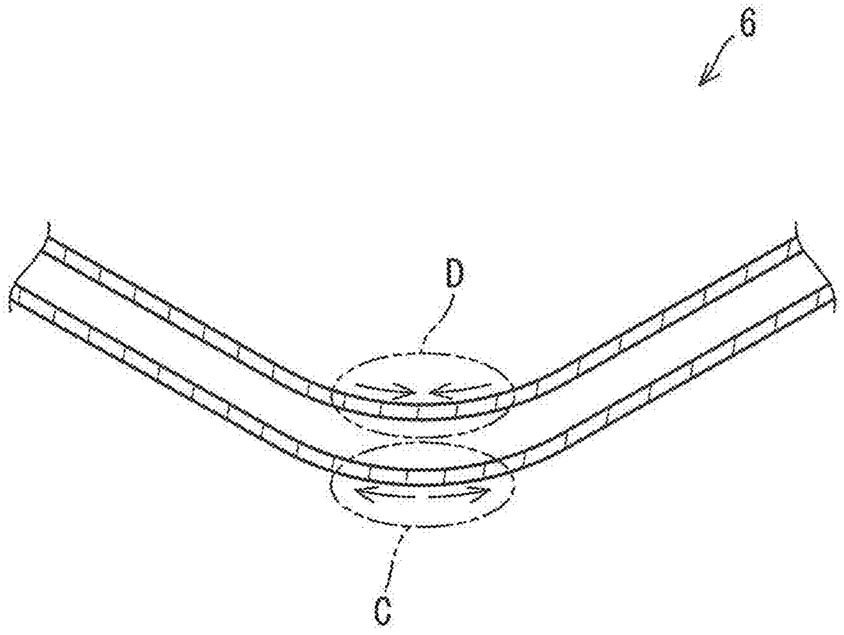
FIG. 6 illustrates a vertical cross section of the shaft when the shaft is bent.

FIG. 6 is a part of a vertical cross-sectional view of the shaft 6 which is subjected to flexural deformation. The deformation shown in FIG. 6 corresponds to the deformation of the shaft 6 caused when measuring the three-point flexural strength. The deformation in FIG. 6 is exaggerated for the sake of easy understanding.

As shown in FIG. 6, when the shaft 6 is subjected to the flexural deformation, a flexural outer side C having a larger curvature radius and a flexural inner side D having a smaller curvature radius are generated in the shaft 6. If the thickness of the outer full length hoop layer f2 is increased and the full length straight layers are located relatively on the further inner layer side, the tensile strength of the flexural outer side C reduces. For this reason, tensile fracture on the flexural outer side C, not compressive fracture on the flexural inner side D, is likely to occur. By making the resin content of the outer full length hoop layer f2 lower than the resin content of the inner full length hoop layer f1, the amount of fibers of the outer full length hoop layer f2 can be maintained while suppressing the thickness T2 of the outer full length hoop layer f2. Accordingly, the tensile fracture on the flexural outer side C when the shaft 6 is subjected to flexural deformation is suppressed. In addition, even when tensile fracture occurs on the flexural outer side C, it is possible to increase the strength of the shaft 6 until the fracture occurs. As a result, the strength of the shaft 6 can be increased.

The shaft 6 may have a flexural inner-side fracture portion D1 in which the starting point of fracture in the three-point flexural strength test is located on the flexural inner side D, not on the flexural outer side C (see FIG. 1). The flexural inner-side fracture portion D1 can prevent the tensile fracture of the flexural outer side C, which can effectively increase the strength of the shaft 6. From this viewpoint, it is preferable that the flexural inner-side fracture portion D1 is present in the region Rf in which both the inner full length hoop layer f1 and the outer full length hoop layer f2 are disposed.

The outer full length hoop layer f2 is located outside the inner full length hoop layer f1, and has a larger radius. Accordingly, the area of the prepreg constituting the outer full length hoop layer f2 is large. By reducing the resin content of the outer full length hoop layer f2, the total weight of the prepregs can be effectively suppressed. Accordingly, the shaft 6 can be reduced in weight while maintaining its strength.

As the inner full length hoop layer f1 is disposed on the further inner layer side, its advantageous effect increases. As the outer full length hoop layer f2 is disposed on the further outer layer side, its advantageous effect increases. From these viewpoints, it is preferable that at least one full length straight layer is disposed between the inner full length hoop layer f1 and the outer full length hoop layer f2. In the embodiment of FIG. 2, two full length straight layers s7 and s9 are disposed between the inner full length hoop layer f1 and the outer full length hoop layer f2. In the embodiment of FIG. 2, all the full length straight layers s7 and s9 excluding the outermost full length straight layer s11 are disposed between the inner full length hoop layer f1 and the outer full length hoop layer f2. In the embodiment of FIG. 2, the number of plies of the full length straight layer s7 is one, and the number of plies of the full length straight layer s9 is one. From the same viewpoints, it is preferable that at least one full length bias layer is disposed between the inner full length hoop layer f1 and the outer full length hoop layer f2. In the embodiment of FIG. 2, one full length bias layer s4 is disposed between the inner full length hoop layer f1 and the outer full length hoop layer f2. Alternatively, two full length bias layers s2 and s4 may be disposed between the inner full length hoop layer f1 and the outer full length hoop layer f2. All the full length bias layers s2 and s4 may be disposed between the inner full length hoop layer f1 and the outer full length hoop layer f2. In the embodiment of FIG. 2, the innermost layer of the body layers m1 is the full length bias layer s2, and the inner full length hoop layer f1 is disposed contiguous to the outer side of the full length bias layer s2.

A ratio (T2/T1) is a ratio of the thickness T2 of the outer full length hoop layer f2 to the thickness T1 of the inner full length hoop layer f1. From the viewpoint of reducing the shaft weight while suppressing the compressive deformation and increasing the strength of the shaft 6, T2/T1 is preferably greater than 1, more preferably greater than or equal to 1.2, and still more preferably greater than or equal to 1.4. By suppressing the thickness T2 of the outer full length hoop layer f2, the full length straight layers can be disposed relatively on the further outer layer side, and the flexural rigidity of the shaft 6 can be maintained. In addition, if the thickness T1 is excessively small relative to the thickness T2, the degree of the advantageous effect of the inner full length hoop layer f1 is reduced as compared with the degree of the advantageous effect of the outer full length hoop layer f2, and the strength on the inner layer side of the shaft 6 against tensile stress is reduced. From these viewpoints, T2/T1 is preferably less than 2, more preferably less than or equal to 1.9, and still more preferably less than or equal to 1.8.

From the viewpoint of making the thickness T2 greater than the thickness T1, the thickness T2 of the outer full length hoop layer f2 is preferably greater than or equal to 0.020 mm, more preferably greater than or equal to 0.030 mm, and still more preferably greater than or equal to 0.040 mm. From the viewpoint of making the ratio T2/T1 less than 2, the thickness T2 is preferably less than or equal to 0.085 mm, more preferably less than or equal to 0.075 mm, and still more preferably less than or equal to 0.065 mm.

The fiber basis weight of the inner full length hoop layer f1 is denoted by F1 (g/m$^2$). The fiber basis weight of the outer full length hoop layer f2 is denoted by F2 (g/m$^2$). The fiber basis weight means the weight of carbon fibers per unit area of a prepreg.

(F1+F2) is the sum of the fiber basis weight of the inner full length hoop layer f1 and the fiber basis weight of the outer full length hoop layer f2. From the viewpoint of suppressing the compressive deformation, (F1+F2) is preferably greater than or equal to 60 (g/m$^2$), more preferably greater than or equal to 75 (g/m$^2$), and still more preferably greater than or equal to 90 (g/m$^2$). From the viewpoint of weight reduction of the shaft 6, (F1+F2) is preferably less than or equal to 150 (g/m$^2$), more preferably less than or equal to 140 (g/m$^2$), and still more preferably less than or equal to 130 (g/m$^2$).

The number of plies of the inner full length hoop layer f1 is not limited. From the viewpoint of uniformity in the circumferential direction of the shaft 6, the number of plies of the inner full length hoop layer f1 is preferably an integer. Considering weight reduction of the shaft, the number of plies of the inner full length hoop layer f1 is preferably greater than or equal to 1 and less than or equal to 3, more preferably greater than or equal to 1 and less than or equal to 2, and still more preferably 1.

The number of plies of the outer full length hoop layer f2 is not limited. From the viewpoint of uniformity in the circumferential direction of the shaft 6, the number of plies of the outer full length hoop layer f2 is preferably an integer. Considering weight reduction of the shaft, the number of plies of the outer full length hoop layer f2 is preferably greater than or equal to 1 and less than or equal to 3, more preferably greater than or equal to 1 and less than or equal to 2, and still more preferably 1.

Note that the number of plies means the number of windings. For example, "the number of plies is 1" means that the number of windings is 1, which means that a layer is wound one complete turn (360°). Considering unintentional cutting or winding error of a prepreg, when the number of plies is an integer, variation in the number of plies ranging from −0.1 to +0.1 or ranging from −0.05 to +0.05 relative to the integer may be considered as a permitted tolerance. For example, one ply (the number of plies is 1) may mean greater than or equal to 0.9 plies and less than or equal to 1.1 plies, and may further mean greater than or equal to 0.95 plies and less than or equal to 1.05 plies.

The above-described structure including the inner full length hoop layer f1 and the outer full length hoop layer f2 can achieve a shaft having high strength even when having a light weight. The structure exhibits a high advantageous effect in a lightweight shaft. From this viewpoint, the weight of the shaft 6 is preferably less than or equal to 60 g, more preferably less than or equal to 50 g, still more preferably less than or equal to 40 g, and still more preferably less than or equal to 30 g. From the viewpoint of flexural rigidity (flex), the weight of the shaft 6 is preferably greater than or equal to 15 g, more preferably greater than or equal to 20 g, and still more preferably greater than or equal to 25 g.

As described above, by maintaining the amount of fibers of the outer full length hoop layer f2 while suppressing the thickness T2 of the outer full length hoop layer f2, the strength of the shaft 6 can be increased while maintaining its flexural rigidity. From this viewpoint, the resin content of the outer full length hoop layer f2 is preferably less than 30%, more preferably less than 25%, and still more preferably less than 20%. When the resin content is low, the tackiness of the prepreg reduces, which can reduce workability of winding the prepreg. From this viewpoint, the resin content of the outer full length hoop layer f2 is preferably greater than or equal to 10%, more preferably greater than or equal to 12%, and still more preferably greater than or equal to 14%. In the present disclosure, the unit of resin content is % by weight. A value obtained by subtracting resin content from 100 is fiber content (% by weight).

Considering the difference in resin content between the inner full length hoop layer f1 and the outer full length hoop layer f2, the resin content of the inner full length hoop layer f1 is preferably greater than or equal to 18%, more preferably greater than or equal to 24%, and still more preferably greater than or equal to 30%. From the viewpoint of weight reduction of the shaft, the resin content of the inner full length hoop layer f1 is preferably less than or equal to 60%, more preferably less than or equal to 50%, and still more preferably less than or equal to 40%.

From the viewpoint of increasing the advantageous effect of suppressing the compressive deformation, the fiber elastic modulus (tensile elastic modulus) of the inner full length hoop layer f1 and/or the fiber elastic modulus (tensile elastic modulus) of the outer full length hoop layer f2 are/is preferably greater than or equal to 30 (t/mm$^2$), more preferably greater than or equal to 33 (t/mm$^2$), and still more preferably greater than or equal to 40 (t/mm$^2$). Fibers having a high tensile elastic modulus tend to reduce tensile strength. From this viewpoint, the fiber elastic modulus (tensile elastic modulus) of the inner full length hoop layer f1 and/or the fiber elastic modulus (tensile elastic modulus) of the outer full length hoop layer f2 are/is preferably less than or equal to 60 (t/mm$^2$), more preferably less than or equal to 55 (t/mm$^2$), and still more preferably less than or equal to 50 (t/mm$^2$). More preferably, fiber elastic moduli of both the inner full length hoop layer f1 and the outer full length hoop layer f2 satisfy these numerical ranges. From the viewpoint of compressive deformation, at least the fiber elastic modulus of the outer full length hoop layer f2 may be greater than or equal to 30 (t/mm$^2$), may further be greater than or equal to 33 (t/mm$^2$), and still may further be greater than or equal to 40 (t/mm$^2$).

As described above, the shaft 6 includes full length layers other than the full length hoop layers f1 and f2. The above-described structure can increase the strength of a lightweight shaft and is effective in a lightweight shaft. From this viewpoint, at least one of the full length layers other than the full length hoop layers f1 and f2 preferably has a resin content of less than 25%, more preferably less than 20%, and still more preferably less than 18%. When the resin content is low, the tackiness of the prepreg reduces, which can reduce workability of winding the prepreg. From this viewpoint, at least one of the full length layers other than the full length hoop layers f1 and f2 preferably has a resin content of greater than or equal to 10%, more preferably greater than or equal to 12%, and still more preferably greater than or equal to 14%. The full length layers other than the full length hoop layers f1 and f2 may be full length straight layers, for example. That is, at least one of the full length straight layers may have a resin content of less than 25%, further less than 20%, and still further less than 18%. The full length layers other than the full length hoop layers f1 and f2 may be full length bias layers, for example. That is, at least one of the full length bias layers may have a resin content of less than 25%, further less than 20%, and still further less than 18%.

The shaft entire length L is not limited. When the shaft entire length L is long, it is necessary to reduce the shaft weight per unit length for achieving weight reduction of the shaft. Accordingly, a structure that can achieve a lightweight and high strength shaft is more effective in this case. From this viewpoint, the shaft entire length L is preferably greater than or equal to 1016 mm, more preferably greater than or equal to 1054 mm, and still more preferably greater than or equal to 1092 mm. From the viewpoint of ease of hitting a ball and weight reduction of the shaft, the shaft entire length L is preferably less than or equal to 1270 mm, more preferably less than or equal to 1245 mm, and still more preferably less than or equal to 1219 mm.

The shaft 6 may be used for a driver (No. 1 wood), may be used for a fairway wood type club, may be used for a hybrid club, or may be used for an iron club. As described above, when the shaft entire length L is long, a structure that can achieve a lightweight and high strength shaft is effective. From this viewpoint, the shaft 6 is preferably used for a driver, a fairway wood type club, or a hybrid club, and more preferably used for a driver or a fairway wood type club.

EXAMPLES

Example 1

A shaft having the same configuration as the shaft 6 was produced in accordance with the above-described manufacturing processes. The laminated configuration of the shaft was as shown in FIG. 2. The layer s1 was a glass fiber reinforced layer. The remaining layers s2 to s12 were carbon fiber reinforced layers. The shaft entire length L was 1168 mm. The shaft weight was 38.0 g. The trade name "8253S-4" manufactured by Toray Industries, Inc. was used as the inner full length hoop layer f1. The inner full length hoop layer f1 had a thickness T1 of 0.037 mm, a resin content of 30% by weight, and a fiber elastic modulus of 30 t/mm$^2$. The trade name "2255S-7" manufactured by Toray Industries, Inc. was used as the outer full length hoop layer f2. The outer full length hoop layer f2 had a thickness T2 of 0.061 mm, a resin content of 24% by weight, and a fiber elastic modulus of 30 t/mm$^2$.

Comparative Example 1

The trade name "8253S-4" manufactured by Toray Industries, Inc. was used as the outer full length hoop layer f2. The number of plies of the outer full length hoop layer f2 was 2. The outer full length hoop layer f2 had a thickness T2 of 0.074 mm, a resin content of 30% by weight, and a fiber elastic modulus of 30 t/mm$^2$. A shaft of Comparative Example 1 was obtained in the same manner as in Example 1 except for the above-described matters.

Comparative Example 2

A shaft of Comparative Example 2 was produced by exchanging the materials of the inner full length hoop layer f1 and the outer full length hoop layer f2 in Example 1. That is, the trade name "2255S-7" manufactured by Toray Industries, Inc. was used as the inner full length hoop layer f1. The inner full length hoop layer f1 had a thickness T1 of 0.061 mm, a resin content of 24% by weight, and a fiber elastic modulus of 30 t/mm$^2$. The trade name "8253S-4" manufactured by Toray Industries, Inc. was used as the outer full length hoop layer f2. The outer full length hoop layer f2 had a thickness T2 of 0.037 mm, a resin content of 30% by weight, and a fiber elastic modulus of 30 t/mm$^2$. The shaft of Comparative Example 2 was obtained in the same manner as in Example 1 except for the above-described matters.

Comparative Example 3

The trade name "8253S-4" manufactured by Toray Industries, Inc. was used as the inner full length hoop layer f1. The inner full length hoop layer f1 had a thickness T1 of 0.037 mm, a resin content of 30% by weight, and a fiber elastic modulus of 30 t/mm$^2$. The trade name "MRX350C-100S" manufactured by Mitsubishi Chemical Corporation was used as the outer full length hoop layer f2. The outer full length hoop layer f2 had a thickness T2 of 0.083 mm, a resin content of 25% by weight, and a fiber elastic modulus of 30 t/mm$^2$. T2/T1 was 2.2. A shaft of Comparative Example 3 was obtained in the same manner as in Example 1 except for the above-described matters.

Comparative Example 4

The trade name "8053S-3" manufactured by Toray Industries, Inc. was used as the inner full length hoop layer f1. The inner full length hoop layer f1 had a thickness T1 of 0.024 mm, a resin content of 30% by weight, and a fiber elastic modulus of 30 t/mm$^2$. The trade name "MRX350C-100S" manufactured by Mitsubishi Chemical Corporation was used as the outer full length hoop layer f2. The outer full length hoop layer f2 had a thickness T2 of 0.083 mm, a resin content of 25% by weight, and a fiber elastic modulus of 30 t/mm$^2$. T2/T1 was 3.5. A shaft of Comparative Example 4 was obtained in the same manner as in Example 1 except for the above-described matters.

Specifications and evaluation results of Example and Comparative Examples are shown in below Table 1.

TABLE 1

Specifications and evaluation results of Example and Comparative Examples

| | unit | Ex. 1 | Comp. Ex. 1 | Comp. Ex. 2 | Comp. Ex. 3 | Comp. Ex. 4 |
|---|---|---|---|---|---|---|
| Shaft entire length L | mm | 1168 | 1168 | 1168 | 1168 | 1168 |
| Shaft weight | grams | 38.5 | 38.5 | 38.5 | 38.5 | 38.5 |
| Thickness T1 of the inner full length hoop layer | mm | 0.037 | 0.037 | 0.061 | 0.037 | 0.024 |
| Resin content of the inner full length hoop layer | wt % | 30 | 30 | 24 | 30 | 30 |
| Fiber elastic modulus of the inner full length hoop layer | t/mm$^2$ | 30 | 30 | 30 | 30 | 30 |
| Fiber basis weight F1 of the inner full length hoop layer | g/m$^2$ | 57 | 57 | 99 | 57 | 36 |
| Thickness T2 of the outer full length hoop layer | mm | 0.061 | 0.074 | 0.037 | 0.083 | 0.083 |
| Resin content of the outer full length hoop layer | wt % | 24 | 30 | 30 | 25 | 25 |
| Fiber elastic modulus of the outer full length hoop layer | t/mm$^2$ | 30 | 30 | 30 | 30 | 30 |

TABLE 1-continued

Specifications and evaluation results of Example and Comparative Examples

| | unit | Ex. 1 | Comp. Ex. 1 | Comp. Ex. 2 | Comp. Ex. 3 | Comp. Ex. 4 |
|---|---|---|---|---|---|---|
| Fiber basis weight F2 of the outer full length hoop layer | $g/m^2$ | 99 | 114 | 57 | 133 | 133 |
| T2/T1 | — | 1.6 | 2.0 | 0.6 | 2.2 | 3.5 |
| Three-point flexural strength (Point T) | kgf | 208.2 | 196.5 | 198.1 | 197.1 | 197.2 |
| Three-point flexural strength (Point AB) | kgf | 58.7 | 53.2 | 55.7 | 52.4 | 53.1 |
| Three-point flexural strength (Point B) | kgf | 75.9 | 67.7 | 67.4 | 69.8 | 72.5 |
| Crushing strength (at a point 550 mm apart from the tip end Tp) | kgf | 22.2 | 16.9 | 19.7 | 19.4 | 19.8 |
| Crushing strength (at a point 650 mm apart from the tip end Tp) | kgf | 19.6 | 15.6 | 14.2 | 18.0 | 18.7 |

[Evaluation]

The three-point flexural strength and crushing strength of the shafts were evaluated. Measurement methods for these strengths were as described above. The three-point flexural strength was measured at the point T that is close to the head and at which a strong stress is applied, and the point AB and the point B at which the curvature radius of flexure tends to be large. The crushing strength was measured at positions (a point located 550 mm apart from the tip end Tp, and a point located 650 mm apart from the tip end Tp) located in a shaft intermediate portion where the curvature radius of flexure tends to be large. In the measurement of three-point flexural strength, five samples were measured for each shaft and their average values were calculated. The average values are shown in Table 1. In the measurement of crushing strength, two samples were measured for each shaft and their average values were calculated. The average values are shown in Table 1.

The shaft of Example 1 was subjected to the crushing strength test at its plurality of positions, and it was found that the vertical fracture portion V1 in which the starting point of fracture is located in the vertical position V (see FIG. 4), and the horizontal fracture portion H1 in which the starting point of fracture is located in the horizontal position H were present. The point located 550 mm apart from the tip end Tp was the vertical fracture portion V1. The point located 650 mm apart from the tip end Tp was the horizontal fracture portion H1.

As to Example 1, the starting point of fracture in the three-point flexural strength test was studied, and it was found that the flexural inner-side fracture portion D1 in which the starting point of fracture was located on the flexural inner side D was present. The point B was the flexural inner-side fracture portion D1.

As shown in Table 1, Example is highly evaluated as compared with Comparative Examples.

The following clauses are a part of invention included in the present disclosure.

[Clause 1]

A golf club shaft including a plurality of fiber reinforced resin layers, a tip end, and a butt end, wherein the fiber reinforced resin layers include one or more straight layers, one or more bias layers, and hoop layers, an entire length of the golf club shaft is denoted by L, the one or more straight layers include one or more full length straight layers each having a length of greater than or equal to 0.7L relative to the entire length L of the golf club shaft, the hoop layers include full length hoop layers each having a length of greater than or equal to 0.7L relative to the entire length L of the golf club shaft, the full length hoop layers consist only of one inner full length hoop layer, and one outer full length hoop layer located outside the inner full length hoop layer, at least one of the one or more full length straight layers is disposed inside the outer full length hoop layer, when the inner full length hoop layer has a thickness denoted by T1 (mm), and the outer full length hoop layer has a thickness denoted by T2 (mm), T2/T1 is greater than 1 and less than 2, and the outer full length hoop layer has a resin content smaller than a resin content of the inner full length hoop layer.

[Clause 2]

The golf club shaft according to clause 1, wherein the resin content of the outer full length hoop layer is less than 30%.

[Clause 3]

The golf club shaft according to clause 1 or 2, wherein the inner full length hoop layer and/or the outer full length hoop layer has a fiber elastic modulus of greater than or equal to 30 $t/mm^2$.

[Clause 4]

The golf club shaft according to any one of clauses 1 to 3, wherein the golf club shaft has a weight of greater than or equal to 15 g and less than or equal to 60 g.

[Clause 5]

The golf club shaft according to any one of clauses 1 to 4, wherein the fiber reinforced resin layers include a protective layer that is polished, and body layers located inside the protective layer, and the protective layer is one of the one or more straight layers or a resin layer that does not contain fibers.

[Clause 6]

The golf club shaft according to clause 5, wherein the body layers include a plurality of full length layers each having a length of greater than or equal to 0.7L relative to the entire length L of the golf club shaft, and among the full length layers of the body layers, an outermost layer is the outer full length hoop layer.

[Clause 7]

The golf club shaft according to any one of clauses 1 to 6, wherein at least one of the one or more full length straight layers is disposed between the inner full length hoop layer and the outer full length hoop layer.

[Clause 8]

The golf club shaft according to any one of clauses 1 to 7, wherein the one or more bias layers include one or more full length bias layers each having a length of greater than or equal to 0.7L relative to the entire length L of the golf club shaft, and at least one of the one or more full length bias layers is disposed between the inner full length hoop layer and the outer full length hoop layer.

[Clause 9]

The golf club shaft according to any one of clauses 1 to 8, wherein the golf club shaft further includes: a vertical fracture portion in which a starting point of fracture is located in a vertical position in a crushing strength test in which the golf club shaft is compressed in a cross-sectional vertical direction; and a horizontal fracture portion in which the starting point of fracture is located in a horizontal position in the crushing strength test, and the vertical fracture portion and the horizontal fracture portion are present in a region in which both the outer full length hoop layer and the inner full length hoop layer are disposed.

[Clause 10]

The golf club shaft according to any one of clauses 1 to 9, wherein the golf club shaft further includes a flexural inner-side fracture portion in which a starting point of fracture in a three-point flexural strength test is located on a flexural inner side, and the flexural inner-side fracture portion is present in a region in which both the outer full length hoop layer and the inner full length hoop layer are disposed.

LIST OF REFERENCE SYMBOLS

2 Golf club
4 Head
6 Shaft
8 Grip
s1 to s12 Prepreg sheets (layers)
f1 inner full length hoop layer
f2 outer full length hoop layer
m1 Body layer
p1 protective layer
Bt Butt end
Tp Tip end The above descriptions are merely illustrative and various modifications can be made without departing from the principles of the present disclosure.

The terminology used in the description of the various described embodiments herein is for the purpose of describing particular embodiments only and is not intended to be limiting. The use of the terms "a", "an", "the", and similar referents in the context of throughout this disclosure (especially in the context of the following claims) are to be construed to cover both the singular and the plural, unless otherwise indicated herein or clearly contradicted by context. As used throughout this disclosure, the word "may" is used in a permissive sense (i.e., meaning "having the potential to"), rather than the mandatory sense (i.e., meaning "must"). Similarly, as used throughout this disclosure, the terms "comprising," "having," "including," and "containing" are to be construed as open-ended terms (i.e., meaning "including, but not limited to,") unless otherwise noted.

What is claimed is:

1. A golf club shaft comprising: a plurality of fiber reinforced resin layers; a tip end; and a butt end, wherein the fiber reinforced resin layers include one or more straight layers, one or more bias layers, and hoop layers, an entire length of the golf club shaft is denoted by L, the one or more straight layers include one or more full length straight layers each having a length of greater than or equal to 0.7L relative to the entire length L of the golf club shaft, the hoop layers include full length hoop layers each having a length of greater than or equal to 0.7L relative to the entire length L of the golf club shaft, the full length hoop layers consist only of one inner full length hoop layer, and one outer full length hoop layer located outside the inner full length hoop layer, at least one of the one or more full length straight layers is disposed inside the outer full length hoop layer, when the inner full length hoop layer has a thickness denoted by T1 (mm), and the outer full length hoop layer has a thickness denoted by T2 (mm), T2/T1 is greater than 1 and less than 2, and the outer full length hoop layer has a resin content smaller than a resin content of the inner full length hoop layer.

2. The golf club shaft according to claim 1, wherein the resin content of the outer full length hoop layer is less than 30%.

3. The golf club shaft according to claim 1, wherein the inner full length hoop layer and/or the outer full length hoop layer has a fiber elastic modulus of greater than or equal to 30 t/mm$^2$.

4. The golf club shaft according to claim 1, wherein the golf club shaft has a weight of greater than or equal to 15 g and less than or equal to 60 g.

5. The golf club shaft according to claim 1, wherein the fiber reinforced resin layers include a protective layer that is polished, and body layers located inside the protective layer, and the protective layer is one of the one or more straight layers or a resin layer that does not contain fibers.

6. The golf club shaft according to claim 5, wherein the body layers include a plurality of full length layers each having a length of greater than or equal to 0.7L relative to the entire length L of the golf club shaft, and among the full length layers of the body layers, an outermost layer is the outer full length hoop layer.

7. The golf club shaft according to claim 1, wherein at least one of the one or more full length straight layers is disposed between the inner full length hoop layer and the outer full length hoop layer.

8. The golf club shaft according to claim 7, wherein the one or more bias layers include one or more full length bias layers each having a length of greater than or equal to 0.7L relative to the entire length L of the golf club shaft, and at least one of the one or more full length bias layers is disposed between the inner full length hoop layer and the outer full length hoop layer.

9. The golf club shaft according to claim 1, wherein the golf club shaft further includes: a vertical fracture portion in which a starting point of fracture is located in a vertical position in a crushing strength test in which the golf club shaft is compressed in a cross-sectional vertical direction; and a horizontal fracture portion in which the starting point of fracture is located in a horizontal position in the crushing strength test, and the vertical fracture portion and the horizontal fracture portion are present in a region in which both the outer full length hoop layer and the inner full length hoop layer are disposed.

10. The golf club shaft according to claim 1, wherein the golf club shaft further includes a flexural inner-side fracture portion in which a starting point of fracture in a three-point flexural strength test is located on a flexural inner side, and the flexural inner-side fracture portion is present in a region in which both the outer full length hoop layer and the inner full length hoop layer are disposed.

11. The golf club shaft according to claim 9, wherein the crushing strength test is made by:

preparing a sample that has a ring shape, has a point to be measured at its center in an axial direction, and has a width in the axial direction of 10 mm;

placing the sample on a horizontal plane that is an upper surface of a receiving jig; and compressing and fracturing the sample by moving a compressing jig downward, a lower surface of the compressing jig, which is a surface pressing the sample, is a flat surface parallel to the upper surface of the receiving jig, and the compressing jig is moved downward at a speed of 5 mm/min.

12. The golf club shaft according to claim 11, wherein the vertical position is a position having a width in a circumferential direction from −45° to +45° relative to the cross-sectional vertical direction in which the receiving jig and the compressing jig are brought into contact with the sample, and the horizontal position is all positions in the circumferential direction other than the vertical position.

13. The golf club shaft according to claim 10, wherein measurement points of the three-point flexural strength test are a point T, a point A, a point AB, a point B, and a point C, the point T is a position located 90 mm apart from the tip end, the point A is a position located 175 mm apart from the tip end, the point AB is a position located 350 mm apart from the tip end, the point B is a position located 525 mm apart from the tip end, the point C is a position located 175 mm apart from the butt end, and the flexural inner-side fracture portion is present at at least one point among the point T, the point A, the point AB, the point B, and the point C.

14. The golf club shaft according to claim 13, wherein the flexural inner-side fracture portion is present at the point B.

15. The golf club shaft according to claim 8, wherein the one or more bias layers further include a partial bias layer having a length of less than 0.7L relative to the entire length L of the golf club shaft, and the partial bias layer is disposed between the inner full length hoop layer and the outer full length hoop layer.

16. A golf club shaft comprising: a plurality of fiber reinforced resin layers; a tip end; and a butt end, wherein the fiber reinforced resin layers include one or more straight layers, a bias layer, and hoop layers, an entire length of the golf club shaft is denoted by L, the one or more straight layers include one or more full length straight layers each having a length of greater than or equal to 0.7L relative to the entire length L of the golf club shaft, the hoop layers include full length hoop layers each having a length of greater than or equal to 0.7L relative to the entire length L of the golf club shaft, the full length hoop layers include one inner full length hoop layer, and one outer full length hoop layer located outside the inner full length hoop layer, at least one of the one or more full length straight layers is disposed inside the outer full length hoop layer, when the inner full length hoop layer has a thickness denoted by T1 (mm), and the outer full length hoop layer has a thickness denoted by T2 (mm), T2/T1 is greater than 1 and less than 2, the outer full length hoop layer has a resin content smaller than a resin content of the inner full length hoop layer, the golf club shaft further includes: a vertical fracture portion in which a starting point of fracture is located in a vertical position in a crushing strength test in which the golf club shaft is compressed in a cross-sectional vertical direction; and a horizontal fracture portion in which the starting point of fracture is located in a horizontal position in the crushing strength test, and the vertical fracture portion and the horizontal fracture portion are present in a region in which both the outer full length hoop layer and the inner full length hoop layer are disposed.

17. The golf club shaft according to claim 16, wherein the resin content of the outer full length hoop layer is less than 30%.

18. The golf club shaft according to claim 16, wherein the inner full length hoop layer and/or the outer full length hoop layer has a fiber elastic modulus of greater than or equal to 30 t/mm$^2$.

19. The golf club shaft according to claim 16, wherein the fiber reinforced resin layers include a protective layer that is polished, and body layers located inside the protective layer, and the protective layer is one of the one or more straight layers or a resin layer that does not contain fibers.

20. The golf club shaft according to claim 19, wherein the body layers include a plurality of full length layers each having a length of greater than or equal to 0.7L relative to the entire length L of the golf club shaft, and among the full length layers of the body layers, an outermost layer is the outer full length hoop layer.

* * * * *